(12) United States Patent
Reeves et al.

(10) Patent No.: US 10,577,684 B1
(45) Date of Patent: *Mar. 3, 2020

(54) METHOD FOR PRODUCING ULTRAFINE-GRAINED CRYSTALLINE MATERIALS VIA ELECTRON BEAM PROCESSING

(71) Applicant: Mainstream Engineering Corporation, Rockledge, FL (US)

(72) Inventors: Ryan D. Reeves, Melbourne, FL (US); Thomas M. Lasko, Merritt Island, FL (US); Justin J. Hill, Merritt Island, FL (US)

(73) Assignee: Mainstream Engineering Corporation, Rockledge, FL (US)

(*) Notice: Subject to any disclaimer, the term of this patent is extended or adjusted under 35 U.S.C. 154(b) by 295 days.

This patent is subject to a terminal disclaimer.

(21) Appl. No.: 15/810,895

(22) Filed: Nov. 13, 2017

(51) Int. Cl.
| | |
|---|---|
| *C22F 1/16* | (2006.01) |
| *C22F 1/18* | (2006.01) |
| *B23K 15/00* | (2006.01) |
| *B33Y 10/00* | (2015.01) |
| *C22C 14/00* | (2006.01) |

(52) U.S. Cl.
CPC .......... *C22F 1/183* (2013.01); *B23K 15/0086* (2013.01); *B33Y 10/00* (2014.12); *C22C 14/00* (2013.01)

(58) Field of Classification Search
CPC ................. C22F 1/183; B33Y 10/00

USPC ........................................................ 148/523
See application file for complete search history.

(56) References Cited

U.S. PATENT DOCUMENTS

| | | | |
|---|---|---|---|
| 3,178,324 A | 4/1965 | Grange | |
| 9,328,976 B1 * | 5/2016 | Lasko | F28F 21/08 |
| 9,825,214 B1 * | 11/2017 | Reeves | H01L 41/273 |

OTHER PUBLICATIONS

Hall, E.O. The deformation and ageing of mild steel: III discussion of results. Proc. Phys. Soc. 1951, 64 (9), 747-753.
Ma, E. Eight routes to improve the tensile ductility of bulk nanostructured metals and alloys. JOM 2006, 58 (4), 49-53.

* cited by examiner

*Primary Examiner* — Weiping Zhu
(74) *Attorney, Agent, or Firm* — Michael W. O'Neill, Esq.

(57) ABSTRACT

A process is disclosed for restructuring crystalline grain structure and grain size of a material to produce an ultrafine-grain structure. An electron beam source is configured in relation to specific properties of a material forming a solid body to selectively irradiate a surface and a subsurface of that body with electrons at desired locations on the body and to create at least one selectively localized molten pool of defined size in the body. Heat is generated sufficiently rapidly by the beam source to create thermal gradients of sufficient magnitude to permit the body outside of the pool to act as a heat sink and rapidly cool the at least one molten pool, whereby an ultrafine-grain structure and grain size is produced by freezing grain growth upon occurrence of crystal nucleation.

17 Claims, 7 Drawing Sheets

METHOD FOR PRODUCING ULTRAFINE-GRAINED CRYSTALLINE MATERIALS VIA ELECTRON BEAM PROCESSING

STATEMENT REGARDING FEDERALLY SPONSORED RESEARCH OR DEVELOPMENT

This invention was made with Government support under contract W911QY-16-P-0252 awarded by the U.S. Army. The Government has certain rights in the invention.

BACKGROUND AND SUMMARY OF THE INVENTION

The present invention is a novel process for surface and subsurface treatment of crystalline materials to improve mechanical and material properties. Particularly, the present invention is concerned with a process to treat materials, such as metals and their alloys, by exposure to a high energy and power electron beam to restructure the metal or alloy grain structure to produce ultrafine grains. The ultrafine-grained metal or alloy exhibits improved mechanical properties including increased strength and hardness.

Ultrafine-grained crystalline materials are characterized broadly by grain sizes of 10-1000 nm and are often referred to as "nano-grained." Materials with grain sizes within this region are known to possess enhanced strength over the same material with larger grain sizes. This phenomenon was discovered independently in the early 1950's by E. O. Hall [Proc. Phys. Soc., 1951, 64 (9), 747-753] and N.J. Petch and has come to be known as the Hall-Petch relation, which states that the yield strength of a material is inversely proportional to the grain size of that material. The increase in strength with decreasing grain size is due to the relaxation of stress from grain boundary dislocations. Thus, a higher applied stress is necessary to propagate dislocations through the material. This relation holds until the grain size reaches 10-100 nm at which point grain boundary sliding leads to reduction in yield strength with decreasing grain size. Therefore ultrafine-grained structuring of 10-100 nm grains demonstrates the highest yield strength potential.

Typically, tensile strength and ductility of a material are inversely related such that improving one will result in a reduction in the other. For ultrafine-grained material, the deformation mechanisms occur both through dislocation and grain-mediation, resulting in increased plasticity and potentially superplasticity. Experimental evidence has shown that the ductility can be enhanced if the nanostructure is induced through thermo-microstructural treatments as opposed to mechanical shearing while still producing a high tensile strength material [E. Ma, JOM, 2006, 58 (4), 49-53]. In addition, ultrafine-grained materials have exhibited enhanced formability and resistance to crack propagation.

The most common method for creating ultrafine-grained structuring within a metal alloy is to use high-shear mechanical methods. This includes severe plastic deformation, high-pressure torsion, surface mechanical attrition, high-energy milling, cryo-rolling, and sliding wear. However, these methods can be difficult to scale because of the extreme stresses that must be imparted to the metal alloy and, additionally result in decreased ductility. Due to the high degree of shear, the material must display some degree of plasticity, and therefore ceramics and brittle metals cannot be processed through known mechanical methods.

Another method of producing ultrafine-grained structure is through thermal treatment. This is typically conducted through annealing or tempering processes. For example, U.S. Pat. No. 3,178,324 details a thermal cycling process for inducing ultrafine-grained structuring in steel in which the body to be treated is heated in an oven or a melt bath to a specified temperature before being rapidly cooled. The immersion heating heats the surface of the body uniformly through heat conduction into the body of the material. Rapid cooling is achieved through forced air convection or liquid quenching to freeze grain growth. Due to the relatively even heating and cooling over the body surface, the grain structure is largely uniform. This method can, however, only treat near-net shape components as further machining, shaping, or tempering will likely disturb the grain structure.

The present invention is a novel process for creating ultrafine-grained structuring in solid materials such as metals, metal alloys, or ceramics with the purpose of improved material, mechanical, and/or thermal properties. One or more high energy electron beam(s) is/are used to locally heat the surface and subsurface of the body to be treated to above the liquidus transition temperature. We have recognized that this type of heating creates a localized melt pool which is then cooled by the surrounding bulk of the body which has not been heated by the electron beam(s). The surrounding, unheated body acts as a heat sink for the melt pool resulting in rapid cooling which freezes the ultrafine-grained structure and prohibits the grains from growing to thermodynamic equilibrium. The electron beam may raster over the surface of the body to process all or only specified sections of the body.

In electron beam processing, the processing depth directly scales with beam energy. Ultra-high energy (>1 MeV) has been achieved with superconducting linear electron accelerators (scLINACs). Beam energy, which is at least twenty times higher with scLINACs than other electron beam system, scales with process speed (heating rate). High-energy electron beams using a scLINAC are utilized to provide continuous electron beam exposure to the sample piece. The ability of the scLINAC electron beam to precisely deliver energy to a prescribed volume of material is unique as described in U.S. Pat. No. 9,328,976. As a way to succinctly illustrate the principles of the present invention and its advantages, the following discussion compares thermal material processing with electron beam scLINAC processing; specifically, with respect to the ultrafine-grained processing of metals. Processing of ultrafine-grained solids can be accomplished within the scope of our invention, however, with conventional conducting and scLINAC electron beam systems alike. Electron beams produced via scLINACs will be discussed going forward only as an exemplary case.

Energy delivery to a material via an scLINAC-produced electron beam is both rapid and efficient with nearly 100% of the electron energy being imparted to the material. In contrast, conventional thermal processing by contact, convection or irradiation heating is slow, and a large amount of energy is lost to the surroundings or to heat up the instrument itself. Laser irradiation generates plasma that reflects light. Plasma is also generated with such electron beam irradiation, but the electrons are transparent to plasma so that the thermal processing can continue uninhibited at higher power than laser heating. Lasers also only heat the subsurface via conduction, not volumetrically as electron beams heat. The volumetric heating is a result of the electrons penetrating the surface to instantly heat the material below the surface as opposed to heating the surface and relying on heat conduction in the way lasers transfer heat.

Our novel method of rapid heating and cooling differs drastically from known thermal processing techniques by using a point source to bombard the surface and subsurface of a material imparting heat through inelastic collisions. Only a particular area of the body at any one time is processed. Heat conduction can now be limited within the body to maximize the thermal gradients at the melt pool boundary. Flash melting has been demonstrated via high energy and power processing of metals where the impinging electron beam alone causes melting only in the region of intersection between the beam and the material. The timescale of the rastering beam is lower than that the timescale of thermal conduction leading to thermal gradients exceeding 1,000 K/mm. Cooling is provided by the surrounding body which is unaffected by the electron beam and acts as a heat sink. Due to the substantial thermal gradients, cooling rates exceeding 8,000 K/s are possible, leading to sub-cooling of the melt and grain structures frozen in the ultrafine size region.

Bulk thermal cycling, such as taught in above-mentioned U.S. Pat. No. 3,178,324, heats and cools the full bulk of the body through conduction and convection of the gas or liquid outside of the body being processed. In this known process, the goal is to minimize the thermal gradients within the material to ensure homogeneous grain structure formation. The thermal cycling involved in that known method does not melt the body but instead briefly raises it above solid-solid transition temperatures. Cooling is provided by a heat sink external to the processed body whereby the processed body is rapidly, physically moved from a heat bath to a heat sink external to the body unlike electron beam processing where large thermal gradients are required and the cooling comes from the body of the workpiece itself.

An object of the present invention is to employ electron beam processing to create ultrafine-grained structuring within solid materials, e.g., metal, metal alloys, semiconductor, ceramics, or composites to enhance material properties such as enhanced hardness, yield strength, tensile strength, toughness, formability, or resistance to crack propagation among others known to those skilled-in-the-art.

A further object of the present invention is to create hierarchical structuring in the body of the processed material with variations in the grain size as a function of position. Ultrafine-grained structuring through electron beam processing provides unique capabilities in manufacturing not achievable with other methods. The point source and rastering of the electron beam allows all or part of the body to be processed in a targeted manner. For example, the electron beam can be used to induce ultrafine-grained structuring only at the surface of body to improve the hardness of the surface but leave the underlying body untouched to take advantage of the untreated material properties in the bulk. In this way, layered or gradient structures can now be engineered to suit the material needs of an application. This may also be used to induce anisotropy into the body of a material when advantageous.

Yet another object of the present invention is to use electron beam processing to simultaneously additively manufacture components while creating ultrafine-grained structure or hierarchical structuring in the component. Our novel process may also be applied to creating ultrafine-grained structuring while additively manufacturing components to a near-net shape. Near-net shape is defined by the production of the component being very close to the final geometry such that little to no post-processing or refinement is necessary. Building up a component, layer-by-layer, our process for ultrafine-grained structuring may simultaneously be used to additively manufacture by, for example, fusing together raw feedstock materials such as sheet, wire, or powder while creating an ultrafine-grained structure within the component. The individual layers within the layer-by-layer manufacturing may also be processed under different conditions to have hierarchical structuring from the grain structure to the ultimate component structure. This may entail, again by way of example, alternating layers of ultrafine-grained and coarse-grained structures to take advantage of the material properties of each structure. It may be used to create a gradient in the grain structure in the direction of build.

The present invention greatly improves on the known variations of metallurgical microstructure annealing and tempering in that, by using electron beam technology, we are able to produce far-from-equilibrium ultrafine-grained structures by rapid and localized heating, followed by sub-cooling through large thermal gradients.

Other objects, advantages and novel features of the present invention will become apparent from the following detailed description when considered in conjunction with the accompanying drawings and non-limiting examples herein.

DETAILED DESCRIPTION OF THE DRAWINGS

Figure 1:
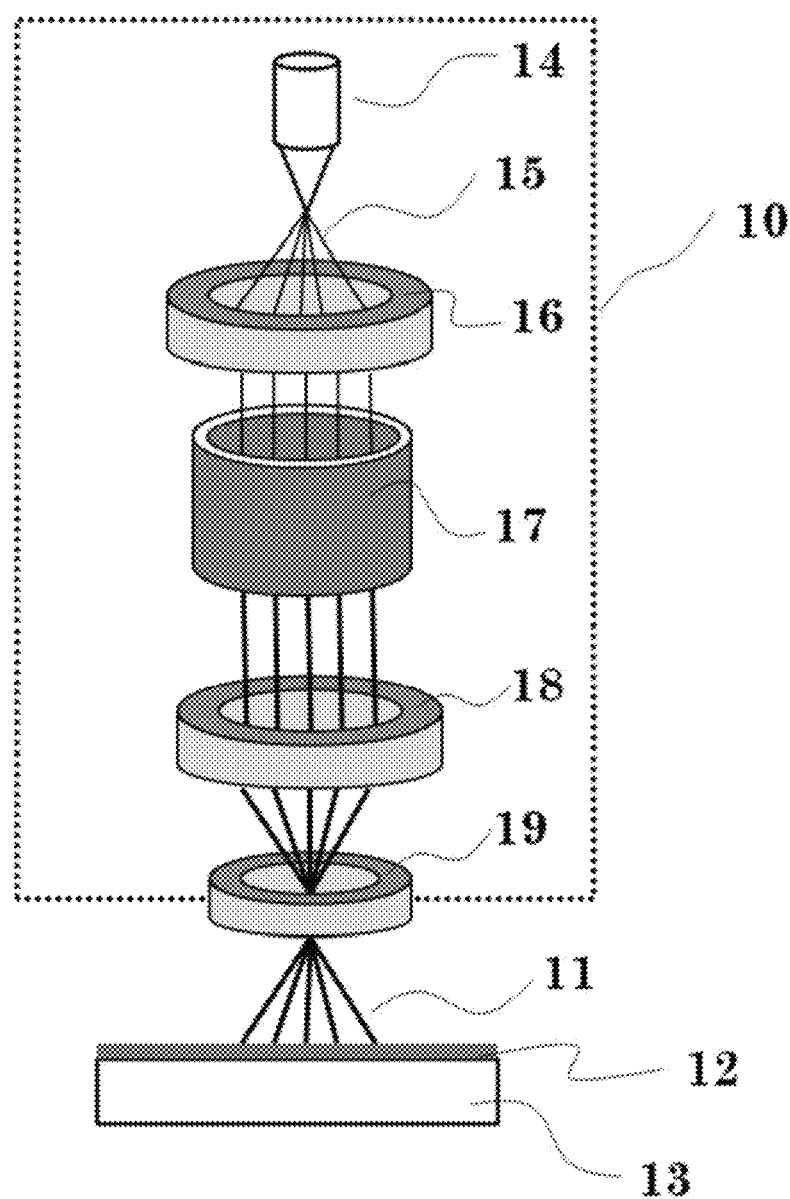
FIG. 1 is a general schematic of a conventional scLINAC electron beam used to process crystalline materials in accordance with the present invention.

A scLINAC electron beam system of conventional construction is shown in FIG. 1 in relation to a workpiece to be processed. The scLINAC electron beam system 10 is represented by the dotted line that encompasses the system elements. The scLINAC electron beam system emits high-energy electrons (>1 MeV) 11 at high continuous power output. The near-relativistic electrons 11 are directed to the workpiece which is composed of a workpiece to be processed 12 on top of a platen 13. The high-energy electron beam bombards the surface/subsurface of the workpiece 12, thereby generating both heat and radiation from scattering events. The amount of heat that is generated generally depends on the beam power and the depth to which this heat is delivered below the surface depends on the accelerating voltage. Normal conducting LINACs or non-accelerated electron beams are generally lower in both average power and energy thus not able to heat as rapidly or as deeply. The platen 13 can be actively cooled or temperature controlled to control the heat flux and temperature of across the workpiece 12.

The scLINAC electron beam system itself 10 is composed of an electron gun 14 to generate and emit the low-energy electrons (<300 keV) 15. The low-energy electrons 15 are represented by the thin vertical lines. The electrons are accelerated and focused by the anode 16. Upon passing through the superconducting linear accelerator cavity 17, the electron beam is accelerated to a higher voltage dramatically, leading to a high-energy electron beam 11 represented by the thick vertical lines. The beam current (power), which originates from the gun 14, is not diminished during acceleration because the accelerator cavity is superconducting. Otherwise, beam power would be reduced by at least 95%. The high-energy electron beam 11 then passes through several apertures and magnetic lenses 18 to collimate, focus, and steer the beam. The lens 18 shown in FIG. 1 is a general representation, but in practice commercially available systems employ many apertures and magnetic lenses both before and after the scLINAC cavity 17. The electron beam 11 may then irradiate an in-vacuum sample platen (not shown) or as is depicted in FIG. 1 pass through an electron window 19 to process the workpiece 12 outside of vacuum.

As is well known and thus not needed to be illustrated, a vacuum pump and cryogenic cooling systems are also required to maintain vacuum and superconductivity within the scLINAC electron beam system (the area defined by dotted lines designated by numeral 10) to dissipate the heat load generated within the scLINAC 17. Using the magnetic lens 18 to spread and raster the electron beam 11 across the surface of the workpiece 12 allows for a large area to be processed in a short time period. Alternatively, the platen 13 and workpiece 12 can be rastered in conjunction with or independent of the electron beam 11 to process different locations along the surface of the workpiece 12. Especially at high accelerating voltages, the material subsurface processing depth of the workpiece 12 can exceed several millimeters or more, depending on the density, atomic number and electron affinity of the processed material.

Figure 2:
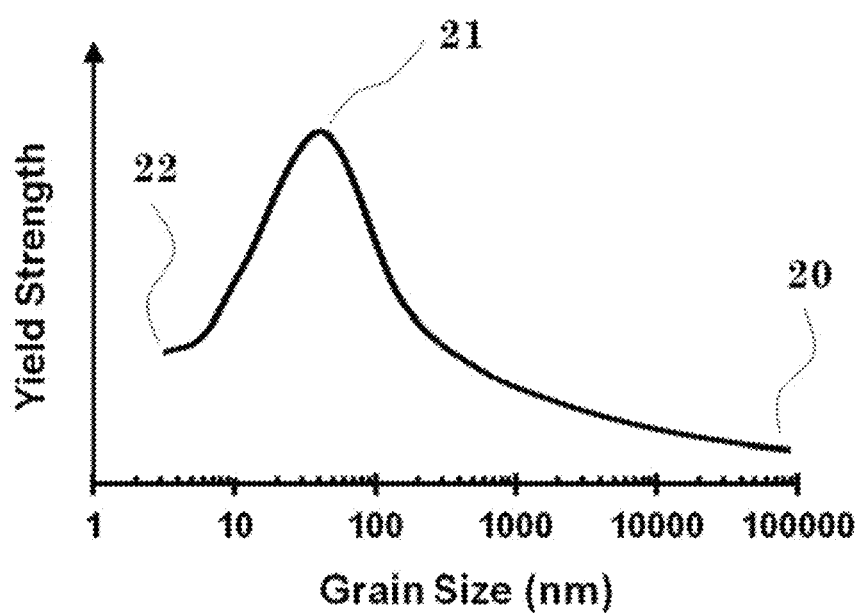
FIG. 2 is a general graphical representation of the Hall-Petch Relation showing the increased yield strength achieved with ultrafine-grained structure.

FIG. 2 is a general depiction of the Hall-Petch Relation. This relationship states that the strength of a material is inversely proportional to the grain size (D). At low temperatures, the yield stress is proportional to $D^{-1/2}$. The strength increases as the grain size decreases from macroscopic grains (>10 μm) 20 to ultrafine grains (10-100 nm) 21 due to the relaxation of stress from grain boundary dislocations. Higher applied stress is necessary to propagate dislocation through the material. Therefore, ultrafine-grained materials 21 can display plasticity due to both dislocations and grain-mediated deformations. However, there is a maximum in the yield strength that can be achieved by reduction in the grain size. As the grain size decreases below 10 nm, it begins to enter an amorphous region 22 where short and/or long-range ordering of atoms is no longer present. For amorphous materials 22, the yield strength decreases due to grain boundary sliding. Therefore, it is necessary to produce ultrafine-grained structuring 21 within a narrow size window. This window is material-dependent, but in general, it resides between 50-100 nm. For example, titanium displays maximum yield strength with a grain size of 100 nm; while the yield strength of aluminum is maximized with a grain size of 50 nm. This necessitates fine control of the temperature gradients and therefore the cooling rates of thermal processing methods such as electron beam treatment.

Figure 3:
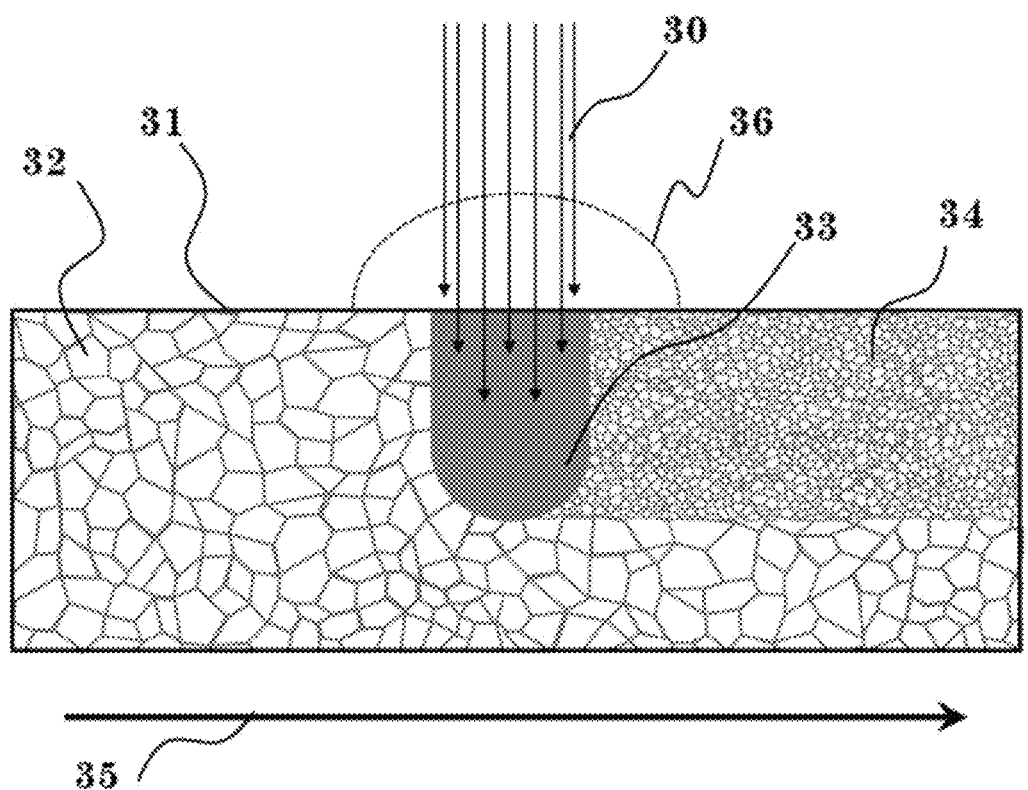
FIG. 3 is a schematic representation of the formation of ultrafine-grained structure of a crystalline material as it is processed with an electron beam according to the present invention.

FIG. 3 schematically illustrates the novel processing of a solid material via an electron beam 30. Here, the sample for processing constitutes a solid body 31 with a surface which is penetrated by the electron beam 30. The solid body 31 may be composed of a metal, metal alloy, ceramic, semiconductor, or composite material among others. The material may take the form of a body 31 of powders (such as a packed powder bed), a crystalline material (either single-crystalline or polycrystalline), or an amorphous material. The specific example depicted in FIG. 3 is a polycrystalline material where the individual grains 32 prior to electron beam treatment are macro-sized (>1000 nm).

When the material body 31 is exposed to the electron beam 30, the electrons penetrate the surface before scattering upon inelastic collisions with the atoms of the material. These collisions transfer energy to the material causing the local temperature to increase dramatically. Upon reaching the melting temperature of the material, the previous grain structure 32 melts into a localized molten pool 33. The geometry of the molten pool 33 will be determined by the selected properties of the electron beam 30, such as beam energy, beam current, exposure time, and beam spot size, as well as the properties of the material including atomic number, thermal conductivity, heat capacity, and density. The material and electron beam properties also determine the thermal gradient generated. Due to the high beam power applied by the scLINAC, large thermal gradients are generated which allow the body 30 of the material to act as a heat sink for the melt pool 33 which results in rapid quenching of the melt. Cooling rates in excess of $10^3$ K/s lead to sub-cooling of the melt. As the electron beam 30 moves along the surface of the material body 31, the melt pool 33 begins to cool due to conduction of heat to the surrounding material. Solidification occurs via nucleation and growth of the crystal grains. Crystal grain growth has an Arrhenius dependence with temperature, meaning that the growth rate increases exponentially with temperatures. In the case of sub-cooled nucleation, the temperature is low such that the nucleation rate is higher than the crystal growth rate. Therefore, many crystal grains form but are frozen before they can grow resulting in a polycrystalline, nano-grain structure 34.

The electron beam 30 can be moved across the surface of the material body 31 either by magnetic steering of the electron beam 30 or mechanical movement of the material body 31. In FIG. 3, the example shown is of the body of the material 30 being moved in the direction of the arrow 35. The rate of this movement 35 of the beam over the body is referred to as the raster rate. The higher the raster rate, the less energy is deposited into any particular area of the body 30. There will be an optimal raster rate for any given material. Too high a raster rate and there will not be enough energy deposited to melt the prior grain structure 32. However, too slow a raster rate and heat will be have time to conduct into the material and reduce the thermal gradients necessary for sub-cooling and nano-grain formation. This movement 35 and the resulting nano-grain structure 34 can also be integrated with a layer-by-layer, additive manufacturing mechanism. For example, the solid body 30 may be composed of a bed of powders, where the numeral 32 now represents individual powders. As the electron beam 30 moves over the surface, it melts and re-solidifies the powder 32 leaving a continuous polycrystalline, nano-grain component in its path. As the shape of the component is melted and solidified into a nano-grain structure, another layer of powder can be deposited over the body 31 in an additive fashion. The process is repeated as the electron beam 30 rasters over the new layer. Therefore, the additively manufactured is endowed with the improved mechanical properties of ultra-fine-grained materials.

As the electron beam 30 penetrates and transfers energy to the solid body 31, heat is generated which in turn generates plasma 36 at the surface of the sample. Electron beams 30 are transparent to plasma 36. Therefore, the electron beam 30 passes through the plasma 36 with little to no scattering. Because the electron beam 30 is not scattered, its energy is fully transferred to the material body, thereby generating very localized, intense heating capable of high thermal gradients which leads to rapid quenching. In contrast to electron beams, lasers produce photons which are scattered by the surface plasma 36 causing some or all of the photons to be reflected and not reach and heat the surface. These reflected photons from lasers are unable to transfer energy to the material body 31 and therefore are wasted in the processing of the sample. Furthermore, the photons that reach the material body 30 do not penetrate the surface but deposit all their energy at the surface. Therefore, heat must be conducted through the material leading to thermal spreading with a loss in the thermal gradient. This limits lasers from generating the sub-cooling necessary to induce nano-grain structuring, unlike electron beams.

FIGS. 4-7 detail a specific example of nano-grain formation in Ti-6Al-4V metal alloy from solution-annealed and aged Ti-6Al-4V sheets conforming to ASM4911. However, the example is not limiting and modifications can be made to our novel process to be applied more broadly by one skilled in the art.

Figure 4:
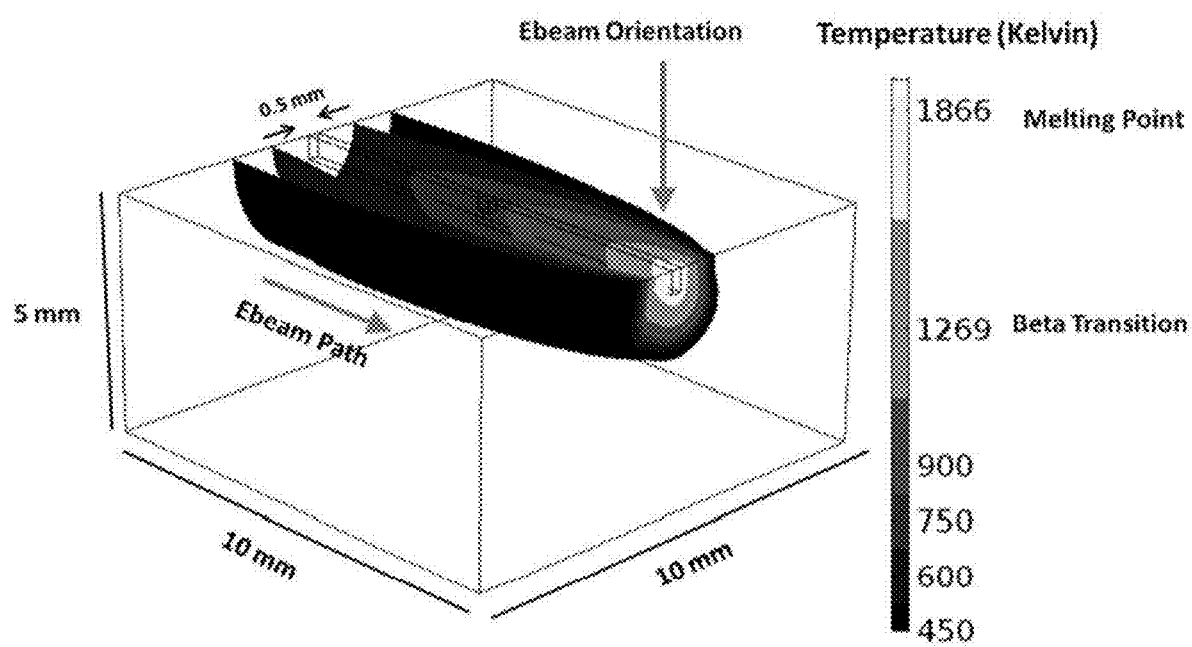
FIG. 4 is an exemplary three-dimensional computational plot of the temperature contours associated with rastering an electron beam over the surface of a Ti-6Al-4V solid block.

The thermal profile of electron beam processing was computationally modeled as shown in FIG. 4. The thermal profile is shown as the beam rasters across the Ti-6Al-4V plate. The residual heat as it moves past an area is shown by the "tail" behind the beam. The dimensions of the simulation were 5×10×10 mm. The two parallel black lines tracing the path of the beam are spaced 0.5 mm apart for perspective. The shading in FIG. 4 is representative of the local temperature from 450 K to 2000 K. The topography at specified temperatures is indicated by the shells of varying shades. The melting point indicates the liquidus temperature (~1920 K). The solidus temperature is ~1870 K. The beta transition temperature, ~1270 K, is the temperature at which the thermodynamically stable crystal phase transitions from the β- to the α-phase crystal grains.

Figure 5:
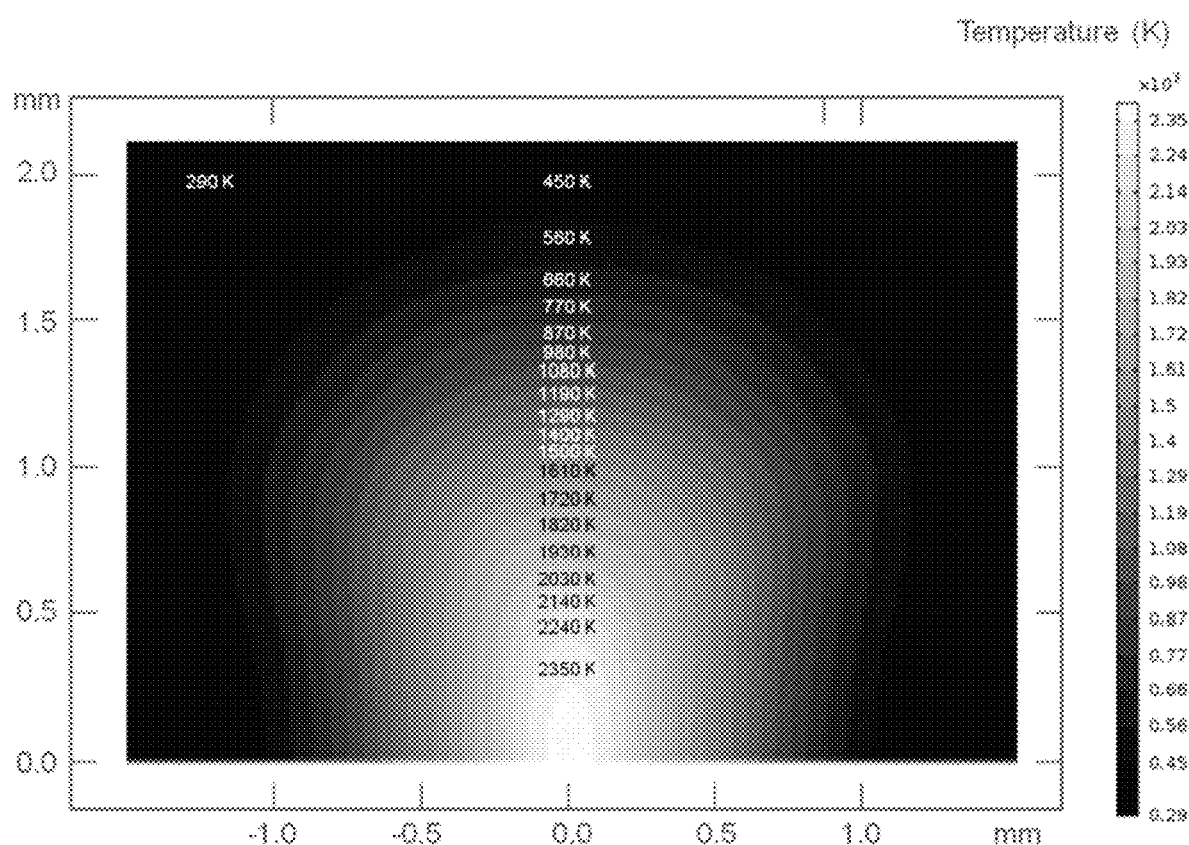
FIG. 5 is a two-dimensional cutaway of the exemplary computational plot of the temperature contours of an electron beam at the surface of a Ti-6Al-4V block.

FIG. 5. is a cutaway of the temperature contours depicted in FIG. 4. The x-axis is representative of the dimension parallel to the Ti-6Al-4V surface centered on the center of the electron beam. The y-axis is representative of the dimension perpendicular to the Ti-6Al-4V with the origin at the surface. FIG. 5 demonstrates the large thermal gradients that are generated by the penetrating electron beam on the surface of Ti-6Al-4V. At the site of the electron beam penetration and the melt pool, the expected thermal gradient is >1300 K/mm due to the large amount of energy deposited over a small area over a short period of time. The time the electron beam interacts with the material is shorter than the characteristic time of heat conduction leading to high thermal gradients. As a result, the surrounding plate acts as a heat sink to the processed material and provides rapid quenching of the melt.

Figure 6:
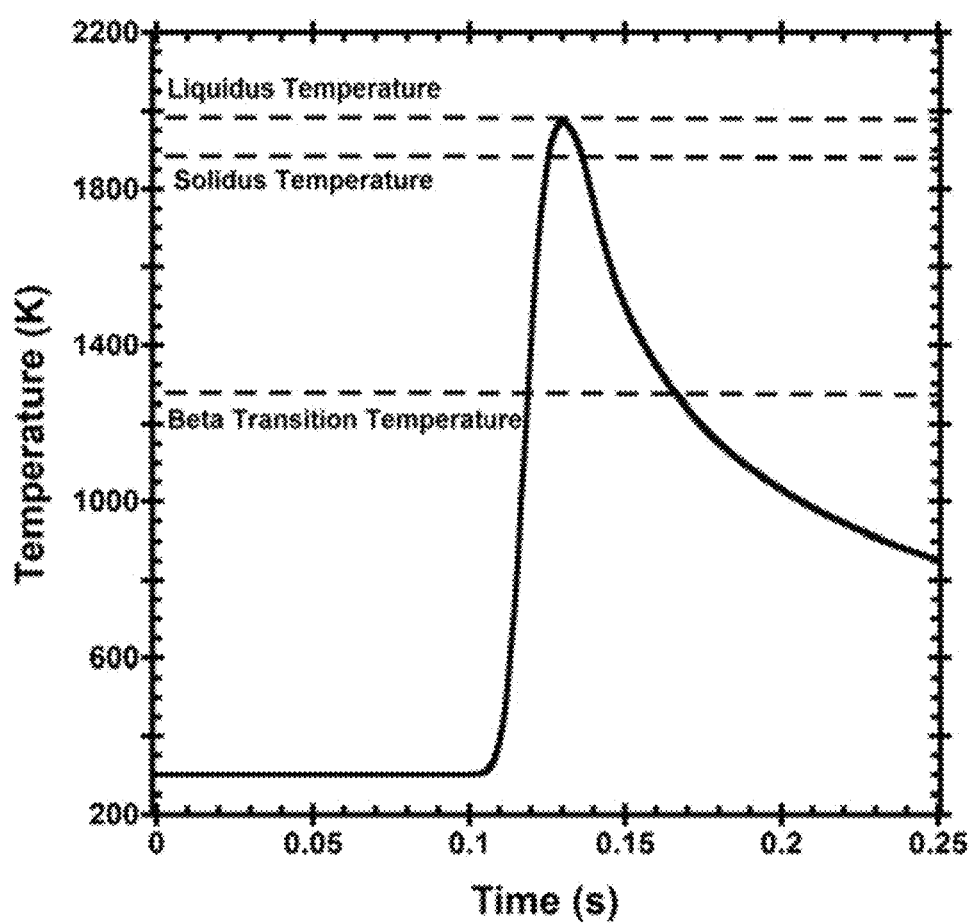
FIG. 6 is an exemplary computational plot of the temperature profile as a function of time for a location in Ti-6Al-4V in the direct path of the electron beam raster pattern depicted in FIG. 4.

This rapid quenching is further emphasized by the thermal profile depicted in FIG. 6 in which the computationally modeled temperature profile at any particular spot in the path of the beam as the beam rasters over that location is shown. The liquidus, solidus, and beta transition temperatures are indicated by the horizontal dashed lines. The heating rate as the beam passes over the location is >60,000 K/s. The localized cooling rate after the beam passes is >8000 K/s over the temperature range of 850 K to 1920 K. This cooling takes place on timescales of $10^{-2}$-$10^{-1}$ s. The cooling rate associated with electron beam processing is orders-of-magnitude faster than conventional or solution cooling, which occur on timescales of $10^1$-$10^4$ s.

Figure 7:
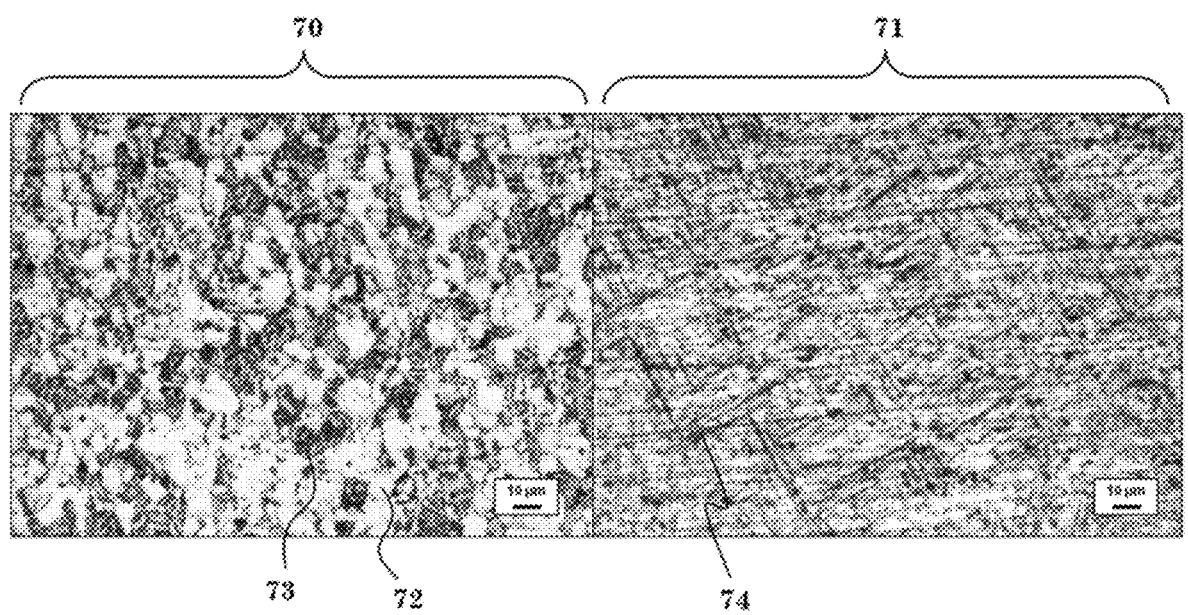
FIG. 7 is scanning electron micrographs of the microstructure of Ti-6Al-4V prior to and after electron beam treatment to produce ultrafine-grained structuring.

Finally, the Ti-6Al-4V sheet was processed with an scLI-NAC electron beam operating under the following conditions:

Electron beam energy: 1.3 MeV
Electron beam current: 0.24 mA
Electron beam diameter: ~3 mm
Raster rate: 27 mm/s FIG. 7 is scanning electron micrographs of the grain structure of the Ti-6Al-4V before processing 70 (untreated sample) and after exposure to the electron beam 71 (treated sample). The samples were mechanically polished and acid etched in Keller's reagent to expose the grain boundaries at the surface. Although the exact tempering and processing path of the untreated Ti-6Al-4V plates 70 as-received are unknown, because they conform to ASM4911 specifications they were assumed to be solution annealed and aged. Also, the untreated microstructure 70 is consistent with equiaxed α-phase 72 and α-/β-phase phase 73 common to solution annealed and aged Ti-6Al-4V. The size of the length and width of the grains in the untreated microstructure 70 are roughly equivalent and 10-20 μm in size. The α-phase grains 72 appear light-colored in the untreated microstructure 70, while the α-/β-phase phase grains 73 appear dark.

In contrast to the untreated sample 70, the grain structure of the treated sample 71 is strictly α-phase grains defined by a fine Widmanstätten or "basket-weave" structure. These lamellar grains 74 are the result of rapid quenching from the beta transition (1270 K). The lamellar grains 74 have a width as low as 50-100 nm but on average 100-200 nm with lengths as ranging from 500 nm-50 μm. While the length may exceed the strict definition of ultrafine-grained size, the mechanical enhancement has been shown to be proportional to the width for lamellar grain structures. Therefore, an ultrafine-grained microstructure was produced through electron beam processing.

While we have shown and described a novel process in accordance with our invention, it should be understood that the same is susceptible to further changes and modifications without departing from the scope of our invention. Therefore, we do not want to be limited to the details shown and described herein but intend to cover all such changes and modifications as are encompassed by the scope of the appended claims.

We claim:

1. A process for restructuring crystalline grain structure and grain size of a material to produce an ultrafine-grain structure, comprising configuring an electron beam source in relation to specific properties of the material forming a solid body to selectively irradiate a surface and a subsurface of the body with electrons at desired locations on the body and to create at least one selectively localized molten pool of defined size in the body, and generating heat sufficiently rapidly to create thermal gradients of sufficient magnitude to permit the body outside of the pool to act as a heat sink and rapidly cool the at least one molten pool to produce the ultrafine-grain structure and grain size by freezing grain growth to an ultrafine structure upon occurrence of crystal nucleation.

2. The process of claim 1, wherein the solid body is comprised of a metal, a metal alloy, a ceramic, a semiconductor or a composite material.

3. The process of claim 1, wherein the body is comprised of powder material, crystalline material or amorphous material.

4. The process of claim 3, wherein the crystalline material is one of single-crystalline and polycrystalline.

5. The process of claim 3, wherein the powder material is comprised of a packed powder bed.

6. The process of claim 1, wherein the body is moveable relative to the electron beam source.

7. The process of claim 6, wherein the relative movement between the electron beam source and the body occurs by magnetic steering of the electron beam source or mechanical movement of the body so as to selectively deposit a desired energy at a target area of the body.

8. The process of claim 1, wherein the electron beam source is accelerated by a superconducting linear electron accelerator.

9. The process of claim 1, wherein the process is an additive manufacturing process.

10. The process of claim 9, further comprising adding another material to the body after the at least one molten pool has solidified into the ultrafine-grained structure so that the electron beam source, once again configured in relation to specific properties of the another material, is able to selectively bombard a surface and optionally a subsurface of the another material to create at least one another selectively localized molten pool in the another material and generate thermal gradients sufficient to permit the another material outside of the pool to rapidly cool the another molten pool to produce an ultrafine-grain layer.

11. The process of claim 10, further comprising adding another ultrafine-grain layer or a coarse-grain layer to the body.

12. The process of claim 11, further comprising adding coarse-grain layers to the body to produce a near-net shape article.

13. The process of claim 12, further comprising alternating the ultrafine-grain layers with the coarse-grain layers in the near-net shape article.

14. The process of claim 1, wherein the ultrafine grain structure is characterized by grain sizes from about 10 nm to 1000 nm.

15. The process of claim 1, wherein the thermal gradients are at least 1,000 K/mm.

16. The process of claim 1, wherein the rapid cooling of the molten pool occurs at cooling rates of at least 8,000 K/s.

17. The process of claim 1, wherein the body having the produced ultrafine-grain structure has anisotropic properties.

* * * * *